Oct. 4, 1949.  H. J. MORAN  2,483,425
CIRCULAR FRAME PILOT CHUTE
Filed Oct. 17, 1945  2 Sheets-Sheet 1
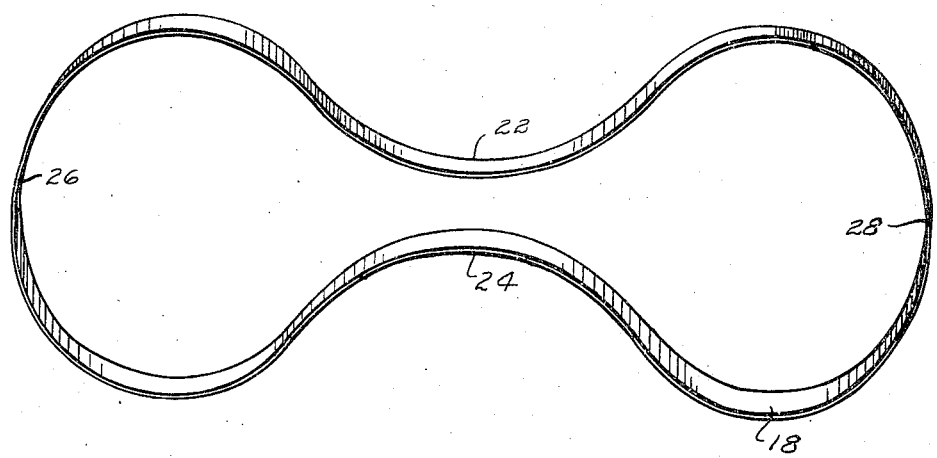
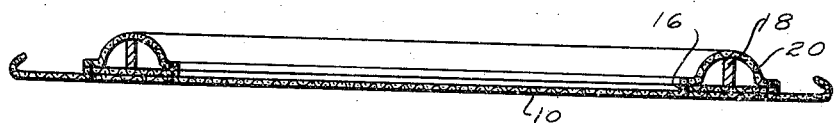
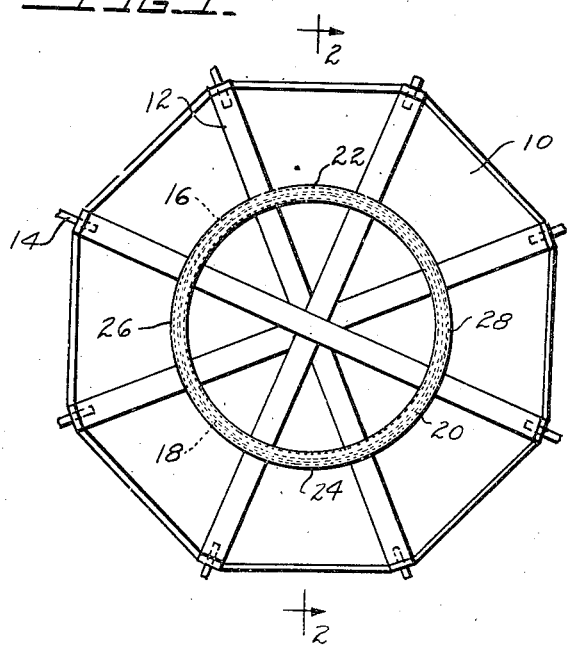
INVENTOR
Harold J. Moran
BY Wade Koontz AND
Frederick W. Cotterman
ATTORNEYS Oct. 4, 1949.                H. J. MORAN                 2,483,425
                       CIRCULAR FRAME PILOT CHUTE
Filed Oct. 17, 1945                                  2 Sheets-Sheet 2
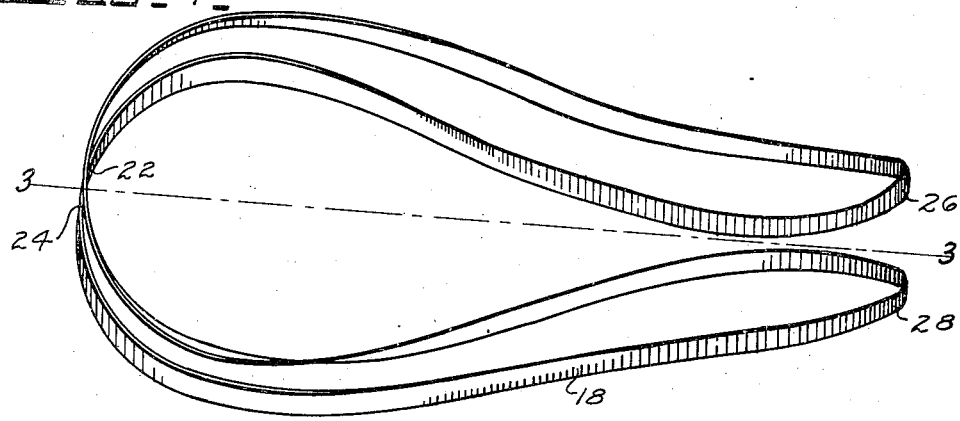
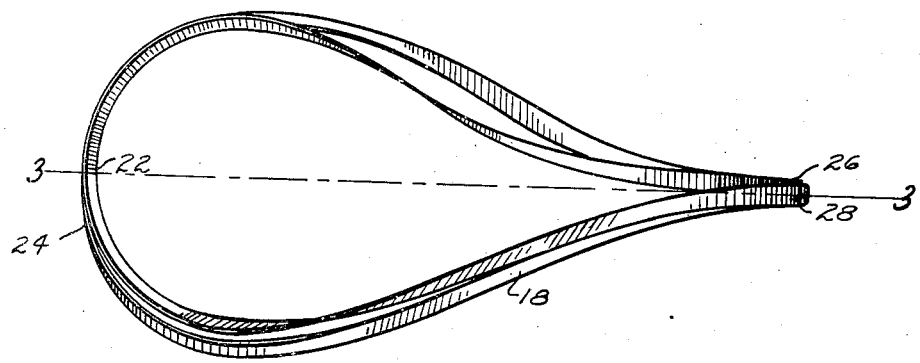
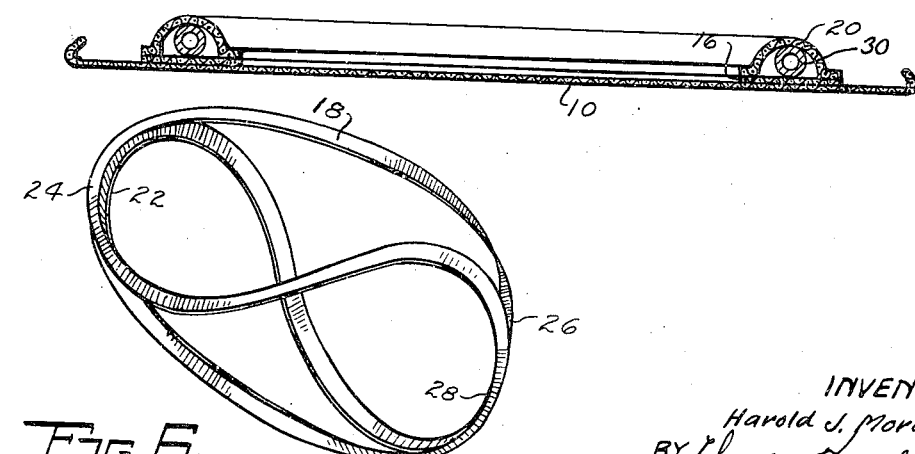
INVENTOR
Harold J. Moran
BY
ATTORNEYS Patented Oct. 4, 1949

2,483,425

UNITED STATES PATENT OFFICE 2,483,425

CIRCULAR FRAME PILOT CHUTE

Harold J. Moran, Pittston, Pa.

Application October 17, 1945, Serial No. 622,911

6 Claims. (Cl. 244—149)

(Granted under the act of March 3, 1883, as amended April 30, 1928; 370 O. G. 757)

The invention described herein may be manufactured and used by or for the Government for governmental purposes without payment to me of any royalty thereon This invention relates to parachutes and has particular application to a pilot parachute and the means for initiating its opening.

An object of the invention is to provide a pilot parachute with opening means which is certain in its operation and effective for its intended purpose.

Another object is to so construct the opening means as to insure satisfactory inside out openings.

Another object is to provide a device of this kind which requires a minimum of labor and material in its construction.

Another object is to so construct the opening means as to cause a swift, sure ejection from the parachute pack with certainty of operation.

I attain these and other objects and advantages in the structure hereinafter described, reference being had to the drawing, wherein:

Fig. 1 is a bottom plan view of my improved parachute in the open position.

Fig. 2 is a section taken at 2—2 of Fig. 1.

Figs. 3, 4, 5, and 6 show several stages through which the opening means passes in opening the pilot chute.

Fig. 7 shows a modification of the device.

Like reference characters refer to like parts throughout the several views.

In Fig. 1 the canopy 10 is reinforced by diametral strips of webbing 12 with shroud lines 14 attached to the ends of the webbing. Intermediate the center and the perimeter of the canopy a strip of webbing 16 is stitched to the canopy in circular pattern concentric with the canopy. A length of flat steel spring stock, similar to clock spring stock, has the ends brought together and joined in the form of a hoop 18 having a diameter equal to the mean diameter of the circular strip 16. The circular spring is concentrically positioned on the attached webbing 16 and a second strip 20 is stitched over it and on to the first strip, thereby maintaining the spring in place between the two attached circular strips 16 and 20.

When folding the pilot parachute preparatory to closing the pack, any opposite points of the fabric in the canopy 10 which are on the hoop circle as for instance, points 22 and 24 on the line 2—2 of Fig. 1, are brought inward toward the center of the hoop and close together so that the spring 18 will assume the hourglass shape shown in Fig. 3 wherein the spring, although deflected from its circular shape, is still wholly in the same plane. Next while still holding the points 22 and 24 in the original plane as shown in Fig. 3, the canopy is again folded to bring the top and bottom of the hourglass together so that opposite points as, for instance, points 26 and 28, Figs. 1 or 3, are brought around and upward in U-shaped formation out of the original plane and nearly together as in Fig. 4, leaving the points 22 and 24 close together as there shown. The loops at 22 and 24, Fig. 4, are now spaced 90 degrees from the loops at 28 and 30 with respect to an axis 3—3. Next while still holding the chute in the shape thus far accomplished, the ends 22 and 24 are brought together or as close as the fabric in the canopy will permit, while the ends 26 and 28 are similarly brought together as in Fig. 5 and the assembly twisted as on the line 3—3 of Figs. 4 or 5 until the spring 18 within the fabric assumes the shape shown in Fig. 6, where the loops at 22 and 24 are substantially in the same plane as the loops at 26 and 28. In attaining this contour, however, the flat clock spring stock is under considerable torsion. While the spring is held in this shape, Fig. 6, the flaps of the pack are closed.

When the ripcord of the pack is pulled, the spring 18 first untwists 90 degrees on the axis 3—3, then the loops at 26 and 28 are spread apart by the bending stress in the loops at 22 and 24, while the loops at 22 and 24 are coincidently spread apart by the bending stress in the loops 26 and 28, until the circular form of the spring is resumed, whereby the pilot chute will be fully open at least to the diameter of the spring hoop 18. Entry of the air will complete the opening in the usual manner.

Instead of the flat spring 18, a close coiled spring 30, as shown in Fig. 7, may be used. Spring 30 should be made of a relatively large wire coiled to a relatively small diameter and the ends joined to provide a ring of the diameter of the ring 18. Spring 30 is assembled with the canopy 10 (see Fig. 7) in the same manner as described with reference to Fig. 2 and is folded and packed in like manner.

Having shown and described a preferred embodiment of my invention and a modification thereof, I claim:

1. A method of packing a pilot parachute into a parachute pack, said parachute being of the kind which consists of a canopy of sheet fabric with a hoop of spring stock concentrically secured thereto, which consists of folding the canopy so as to bring opposite points of the hoop close together without changing the plane of the hoop, further holding the canopy so as to bend other opposite points, which are ninety degrees around the hoop from the first said points, upwardly out of the original plane in U-shaped formation, further folding and flattening the canopy so as to twist the hoop on the axis of the U substantially ninety degrees, then closing the pack.

2. A method of packing a pilot parachute into a parachute pack, said parachute being of the kind which consists of a canopy of sheet fabric with a hoop of spring stock concentrically secured thereto, which consists of folding the canopy so as to bring the hoop to hour glass contour without changing the plane of the hoop, further folding the canopy so as to bend other opposite points, which are intermediate the first said points out of the original plane in U-shaped formation, further folding and flattening the canopy so as to twist the hoop on the axis of the U, then closing the pack.

3. A method of packing a pilot parachute into a parachute pack, said parachute being of the kind which consists of a canopy of sheet fabric with a hoop of spring stock concentrically secured thereto, which consists of folding the canopy so as to bring the hoop to hour glass contour, further folding the canopy so as to bring the top and bottom of the hour glass close together, flattening the canopy to twist the hoop on the axis of the hour glass, then closing the pack.

4. In a pilot parachute having a canopy, an opening means which comprises a length of relatively heavy spring wire, coiled to form an extension spring of relatively small diameter with the ends brought together and joined to compose a hoop, and means for concentrically securing the hoop to the canopy.

5. In a pilot parachute, a sheet fabric canopy and a ribbon of sheet spring stock bent flatwise and formed into a hoop, its thin edge lying against the surface of the canopy and means for retaining said hoop concentrically positioned on said canopy.

6. In a pilot parachute, a sheet fabric canopy and a hoop of thin but wide sheet spring stock, the edge of the hoop lying against the plane of the canopy and means for fastening the hoop to the canopy.

HAROLD J. MORAN.

REFERENCES CITED

The following references are of record in the file of this patent:

UNITED STATES PATENTS

| Number | Name | Date |
| --- | --- | --- |
| 1,272,058 | Kraft | July 9, 1918 |
| 1,295,968 | Calthrop | Mar. 4, 1919 |
| 1,618,009 | Holt | Feb. 15, 1927 |
| 1,867,366 | Madsen | July 12, 1932 |
| 1,890,868 | Simpson et al. | Dec. 13, 1932 |

FOREIGN PATENTS

| Number | Country | Date |
| --- | --- | --- |
| 497,448 | Great Britain | Dec. 20, 1938 |